July 13, 1965

R. LORENZ 3,195,122

CODE TRANSLATOR

Filed July 7, 1960

3 Sheets-Sheet 1

| XS-3 / ZONE | 0000 | 0001 | 0010 | 0011 | 0100 | 0101 | 0110 | 0111 | 1000 | 1001 | 1010 | 1011 | 1100 | 1101 | 1110 | 1111 | |
|---|---|---|---|---|---|---|---|---|---|---|---|---|---|---|---|---|---|
| 00 | 1<br>i<br>9-1 | 0<br>Δ<br>N.P. | 0<br>—<br>11 | 1<br>0<br>0 | 0<br>1<br>1 | 1<br>2<br>2 | 1<br>3<br>3 | 0<br>4<br>4 | 0<br>5<br>5 | 1<br>6<br>6 | 1<br>7<br>7 | 0<br>8<br>8 | 1<br>9<br>9 | 0<br>!<br>12-4-8 | 0<br>ȼ<br>12 | 1<br>(<br>7-5 | PARITY<br>CHARACTER<br>CARD CODE |
| 01 | 0<br>r<br>9-2 | 1<br>,<br>0-3-8 | 1<br>.<br>12-3-8 | 0<br>;<br>9-8 | 1<br>A<br>12-1 | 0<br>B<br>12-2 | 0<br>C<br>12-3 | 1<br>D<br>12-4 | 1<br>E<br>12-5 | 0<br>F<br>12-6 | 0<br>G<br>12-7 | 1<br>H<br>12-8 | 0<br>I<br>12-9 | 1<br>#<br>8-3 | 1<br>¢<br>7-3 | 0<br>@<br>8-4 | PARITY<br>CHARACTER<br>CARD CODE |
| 10 | 0<br>t<br>9-3 | 1<br>"<br>9-5 | 1<br>\|<br>9-7 | 0<br>)<br>7-1 | 1<br>J<br>11-1 | 0<br>K<br>11-2 | 0<br>L<br>11-3 | 1<br>M<br>11-4 | 1<br>N<br>11-5 | 0<br>O<br>11-6 | 0<br>P<br>11-7 | 1<br>Q<br>11-8 | 0<br>R<br>11-9 | 1<br>$<br>11-3-8 | 1<br>*<br>11-4-8 | 0<br>?<br>7-6 | PARITY<br>CHARACTER<br>CARD CODE |
| 11 | 1<br>Σ<br>9-4 | 0<br>B<br>9-6 | 0<br>:<br>7-2 | 1<br>+<br>8-7 | 0<br>/<br>0-1 | 1<br>S<br>0-2 | 1<br>T<br>0-3 | 0<br>U<br>0-4 | 0<br>V<br>0-5 | 1<br>W<br>0-6 | 1<br>X<br>0-7 | 0<br>Y<br>0-8 | 1<br>Z<br>0-9 | 0<br>%<br>0-4-8 | 0<br>=<br>7-4 | 1<br>NOT USED<br>11-12 | PARITY<br>CHARACTER<br>CARD CODE |

EXEMPLARY LEGEND FOR CHARACTERS:

i = PRINTER IGNORE

Δ = PRINTER SPACE r = CARRIAGE RETURN — MULTI-LINE SYMBOL

@ = FAST FEED SYMBOL 1 t = TABULATOR

/ = FAST FEED SYMBOL 2

$ = SHIFT LOCK

? = UNSHIFT - FAST FEED SYMBOL 3

Σ = PRINTER STOP

B = PRINTER BREAKPOINT STOP

= = FAST FEED SYMBOL 4

FIG. 1.

INVENTOR
RAY LORENZ

BY Cushman, Darby & Cushman
ATTORNEY

July 13, 1965 R. LORENZ 3,195,122

CODE TRANSLATOR

Filed July 7, 1960 3 Sheets-Sheet 2

INVENTOR

RAY LORENZ

BY Cushman, Darby & Cushman

ATTORNEYS

INVENTOR
RAY LORENZ

BY Cushman, Darby & Cushman
ATTORNEYS

United States Patent Office 3,195,122

Patented July 13, 1965

3,195,122
CODE TRANSLATOR

Ray Lorenz, Culver City, Calif., assignor to Sperry Rand Corporation, New York, N.Y., a corporation of Delaware Filed July 7, 1960, Ser. No. 41,278
10 Claims. (Cl. 340—347)

This invention relates generally to decoding devices and in particular to a code translator universal in nature since it can change one code to any other preselected code.

In the past, code translators have required separate circuitry for each different code conversion. The present invention allows a translation of one code to any other preselected code without necessitating a change in translating circuitry.

Briefly, in one embodiment, the present invention provides a translator which accepts signals representing the standard IBM 80 column card code one character at a time and converts that code to signals on a selected single pair of matrix memory drive lines so as to select the information of any code which may have been previously loaded into the memory unit at the particular location represented by the intersection of those drive lines. For example, the very same translating device may be used to translate from the 80 column code to the standard "UNIVAC" excess-three code, teletype code, 90 column code, or any of the many other binary coded decimal codes.

One object of this invention, therefore, is the provision of a device for translating from one code to any one of a plurality of other preselected codes without changing the translating circuitry.

Another object in conjunction with the preceding object is the provision of such a device for translating an IBM 80 column card code to any one of the binary coded decimal codes.

Figure 2A:
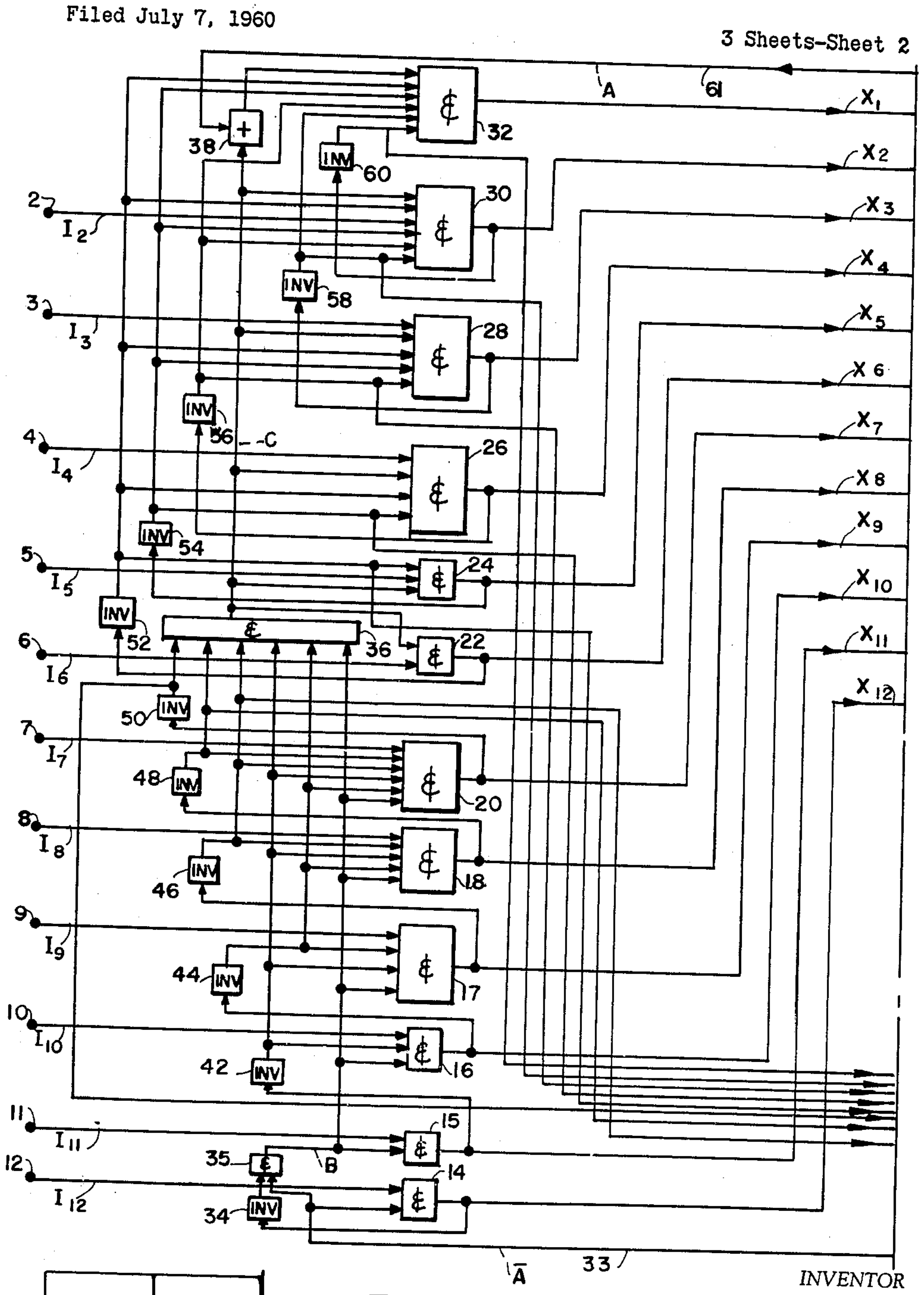
Figure 2:
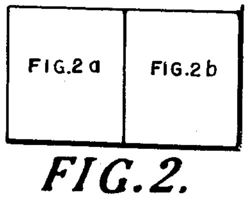
Figure 2B:
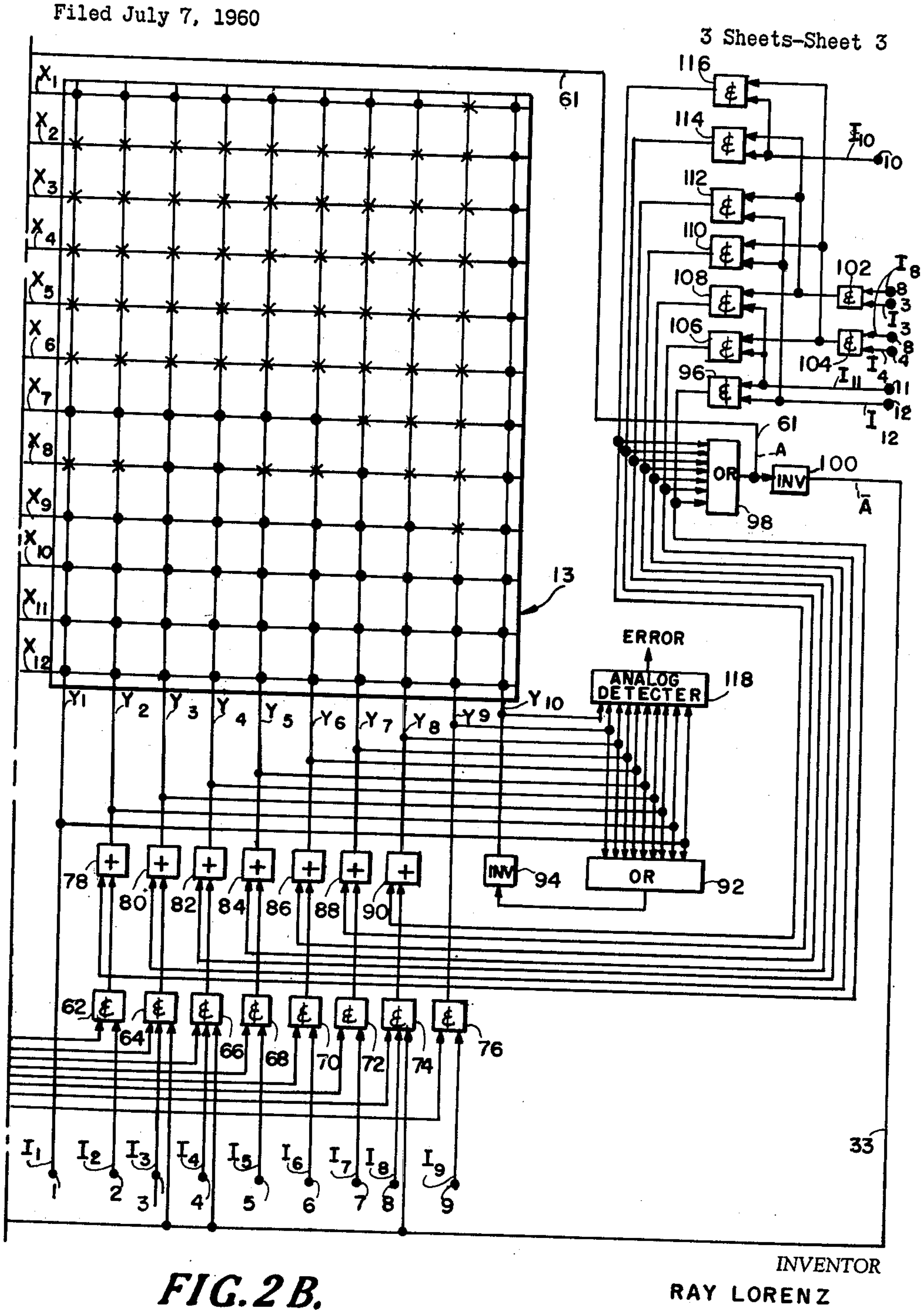

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 is a chart showing characters for and correspondence between a card code and an excess-three code, and FIGURE 2 which is comprised of FIGURES 2*a* and 2*b*, illustrates translating apparatus in conjunction with a memory matrix by which the card code of FIGURE 1 can be converted to any code stored in the matrix.

FIGURE 1 is a chart showing the standard correspondence between the conventional IBM 80 column card code and the standard "UNIVAC" binary coded decimal excess-three code (generally referred to just as the "excess-three code," abbreviated X S–3), as well as the characters which these code combinations represent in conjunction with an exemplary printer operation legend for certain of the characters not self-explanatory or used in their meaning.

Each of the usual 80 columns of the standard IBM card has at least ten discrete positions, usually twelve. These are generally numbered 0–9, 11, 12. As to any one column any character of the varieties shown in FIGURE 1 for example, may be represented by making none, one, two, or three, of those if not more, positions differently characterized than the remainder of the positions in that column. For example, each position in the column may represent a binary 1 or 0 by different magnetization characteristics or by a hole or no-hole (punch, no-punch) as is well known in the art. The following discussion refers to the punch, no-punch representation but no limitation thereto is intended. Each punch may be considered as representing a binary 1, and the no-punches binary 0's. A character in any column then consists of $n$ digits each of which is a 1 or 0 with $n$ being the number of discrete positions punchable in the column. Which one or ones of the digit orders is a 1, i.e., which of the $n$ positions is punched, determines the character represented thereby. In other words, the 0's or no-punches may be effectively disregarded so that the card code can be considered as of the "$a$ out of $n$" type where "$a$" represents the number of 1 digits (holes) in a character which has $n$ digits.

In the specific example of FIGURES 1 and 2, "$n$" equals 12 while "$a$" is a variable equal to 0, 1, 2, or 3, i.e., up to 3 digits of the 12 is represented by a hole rather than a no-hole. For example, in FIGURE 1 the "printer space" character Δ is represented in the card code by none of the 12 positions being punched, the dash or hyphen character is represented by a single punch in the 11 position, the character A is represented by two punches respectively in the 12 and 1 positions, and the percent sign character % is represented by three punches respectively in the 0, 4, and 8 positions. For convenience the 10th digit referred to hereinafter is that corresponding to a punch in the normal 0 position as used for the card code in FIGURE 1.

As above indicated, each column of an IBM 80 column card has a selected punch, no-punch arrangement to indicate only one character. Out of all of the possible combinations per column, only 64 of them are valid code combinations in the IBM 80 column code system. These 64 combinations are shown in FIGURE 1. The 64th combination (11 and 12 positions punched; lower right corner) is unused. Each character represented by punches in the IBM system has a corresponding binary representation in the "UNIVAC" excess-three code.

This latter code consists of seven levels or bits. The most significant bit is the "parity" bit used for error detection purposes. The next lower two levels are called "zone" bits, and the remaining four levels are the "excess-three" bits.

As an example of the correspondence between the card and excess-three codes shown by FIGURE 1, the 11 and 9 positions punched in the card code correspond to the excess-three code 0101100 since both represent the character R.

It can be seen from FIGURE 1 that the IBM 80 column card code system uses six triple punch representations. These six representations are treated as special codes and are handled in a special translator section, to be described later, in the translator apparatus shown in FIGURE 2.

In FIGURE 2 the translating apparatus is supplied with input signals $I_1 \ldots I_{12}$ as they may be derived by any conventional means, for example, from any column of a coded 80 column card source not shown. Any such signal actually present represents the corresponding card digit punched and is presented to its respective translator input terminal. These terminals are given corresponding number designations, i.e., input signal $I_5$ for example is presented to input terminal 5. The ones of the input terminals in FIGURE 2*a* which are numbered the same as the input terminals in FIGURE 2*b* are in effect the same terminal, and vice versa, some being shown separate for clarity. In other words, corresponding signals in FIGURES 2*a* and 2*b* are obtained from common signal lines.

For any valid combination of input signals, the translating device provides a single one of 12 possible X output signals from FIGURE 2*a* and simultaneously a single one of 10 possible Y output signals from FIGURE 2*b* which together are employed to drive a magnetic core memory matrix unit 13 one plane of which is illustrated in FIG- URE 2*b*. The depth of the matrix would correspond to the number of levels required by the bit code to which the 80 column card code is being changed. In a case of the excess-three code, the matrix would have a depth of seven levels as above indicated, plus, if desired, an additional level for error checking purposes to determine whether numerics are involved. Therefore the size of the magnetic memory usable in conjunction with the translator of this invention may be 12 x 10 x 8, when the excess-three code is employed as the output code.

The single plane, or level, of the matrix unit 13 shown in FIGURE 2*b* indicates the coordinate locations of the above mentioned 64 valid code combinations by a dot for each valid location. The remaining invalid locations are indicated by a small *x*. To insure that errors which might have been punched in the card are detected, the information stored in these invalid code locations is purposely made to be in error with respect to the parity bit of the X S–3 code. For example, if an odd parity scheme is used, the data stored in the memory at the invalid locations is made to have an even number of binary ones. Thus, if an invalid code is read from the card, the error will be detected by suitable parity checking circuits associated with the memory read-out lines, not shown.

In FIGURE 2*a*, input signals $I_{12} \ldots I_2$ when occurring are respectively applied to And circuits 14, 15, 16, 17, 18, 20, 22, 24, 26, 28 and 30. (The dot notation employed herein has the usual mathematical significance of the entire series between and including the end characters and should be read as, for example, input signals $I_{12}$ through $I_2$.) The outputs of these And circuits are applied respectively to the X output lines designated $X_{12} \ldots X_2$. Under certain conditions later described, And circuit 14 receives an additional signal from line 33, and when satisfied by that signal and an $I_{12}$ input signal provides an $X_{12}$ which is applied not only to the output line $X_{12}$ but also to inverter 34 the output of which is coupled to And circuit 35. A second input signal when present, is applied to And circuit 35 via line 33. The output of And circuit 35 is applied as an input to each of the succeeding, less significant X output And circuits 15, 16, 17, 18 and 20, and also to And circuit 36. The further succeeding, less significant X output And circuits 24, 26, 28, 30 and 32 are coupled to the output of And circuit 36, the latter via Or circuit 38.

The $X_{11}$ output signal from And circuit 15 is applied to a respective inverter 42 the output of which is coupled as an input to each of the lesser significant And circuits 16, 17, 18 and 20, in conjunction with And circuit 36. Similarly, the outputs from each of the And circuits 16, 17, 18 and 20 are, inverted by respective inverters 44, 46, 48 and 50. And circuit 36 is coupled to the output of each of those inverters, and And circuits 17, 18, and 20 receive an output from each of those inverters which is of greater significance. In like manner, the outputs of And circuits 22, 24, 26, 28 and 30 are applied to respective inverters 52, 54, 56, 58 and 60, with the resultant inverted signals being respectively coupled to each of those And circuits which is of lesser significance. And circuit 32 not only receives the output of And circuit 36 via Or circuit 38, but also receives an output from each of the five inverters 52–60.

The reason for Anding the inversion of the outputs from And circuits 35, 14, 15, 16, 17, 18 and 20 in And circuit 36 is to reduce the number of total inputs required for the six succeeding less significant And circuits 22–32. As later described, And circuit 36 may be in any one of several positions, and Or circuit 38 receives a second input via line 61 during certain operating conditions of the FIGURE 2*b* circuitry.

Since And circuit produces an output only when all of the inputs are present, and an Or circuit produces an output when any of the inputs are present it is apparent from the foregoing, assuming an enabling signal appears on line 33, that none of the And circuits 14 . . . 30 can produce an X output unless at least one of the input signals $I_{12} \ldots I_2$ is present; that when two or more input signals occur simultaneously the input signal of highest significance, i.e., first in the order $I_{12} \ldots I_2$, will cause the corresponding And circuit to produce a signal on the corresponding X output line; and that the inversion of that signal then causes all succeeding, less significant And circuits to be blocked so an output signal appears only on that one X output line.

In the following discussion, the binary 0 is used to represent the absence of a signal while a binary 1 represents the presence of a signal.

As an example of operation of FIGURE 2*a*, assume that the only input signal occurring is $I_8$ and that a signal appears on line 33. The output of And circuit 14 is then 0 since the input signal $I_{12}$ does not appear. The inversion in circuit 34 of this output presents a 1 input to And circuit 35. With a signal on line 33, the output of And circuit 35 is then a 1, which is applied to And circuits 15, 16 17, 18, 20 and 36. With input signals $I_{11}$, $I_{10}$ and $I_9$ being 0, the outputs of And circuits 15, 16, 17 are 0, so the inverted inputs to And circuit 18 are all 1's. Since the $I_8$ input signal occurs (is a 1), And circuit 18 is satisfied and produces a signal on output line $X_8$. The inversion of this signal will present a 0 input to And circuits 20 and 36, preventing any output from any of the succeeding And circuits 20, 22, 24, 26, 28, 30 and 32. Had the $I_9$ input signal been received with the $I_8$ signal, an output signal would have been caused on only the higher significant X output line, i.e., on the $X_9$ output line.

It is noted that And circuit 32 does not require a $I_1$ input signal since if none of the $I_{12} \ldots I_2$ input signals is present, all of the inputs to And circuit 32 are necessarily 1's and a signal automatically appears on the output line $X_1$. In other words, an input signal $I_1$ to this And circuit would be superfluous (and as later shown, undesirable) since an output signal will appear on line $X_1$ whether or not the $I_1$ input signal is applied to And circuit 32.

Each of the X output And circuits, then, receives at least the corresponding input signal $I_{12} \ldots I_2$ and the inversion of the outputs from all preceding, more significant, one or ones of those And circuits with the exception of And circuits 14 and 32. And circuit 14 does not receive the inversion of the output signal of a preceding And circuit but receives instead an inverted signal via line 33. As discussed above, And circuit 32 does not receive a corresponding input $I_1$ but does receive an additional input via line 61.

In FIGURE 2*b*, the input signals $I_2 \ldots I_9$ are additionally applied to respective And circuits 62, 64, 66, 68, 70, 72, 74 and 76. The inversion of the outputs appearing on output lines $X_2 \ldots X_9$, i.e., the outputs of inverters 60, 58, 56, 54, 52, 50, 48, 46, are respectively applied as a second input to those eight And circuits. The And circuits 64, 66 and 74 also receive a third input via line 33 for a purpose to be explained later. The outputs of And circuits 62, 64, 66, 68, 70, 72 and 74 are applied to corresponding Y output lines $Y_2 \ldots Y_8$ through Or circuits 78, 80, 82, 84, 86, 88 and 90, respectively. The output of And circuit 76 is applied directly to the output line $Y_9$, while the input signal $I_1$ is applied directly to the output line $Y_1$. The signals appearing on output lines $Y_1 \ldots Y_9$ are also applied as inputs to Or circuit 92 the output of which is applied to output line $Y_{10}$ via inverter 94.

Each of the output lines $Y_2 \ldots Y_9$ then, receives a signal resulting from Anding at least the respectively associated one of the input signals $I_2 \ldots I_9$ with the inversion of the signal appearing on the respectively associated one of the X output lines $X_2 \ldots X_9$.

With a circuit as so far described in detail, means has been provided for selecting one X output line and one Y output line for each single punch in the IBM code and for each two punch representation with the exception of the double punch 11–12. Several examples will now be described assuming that an enabling signal appears on line 33.

For the single punch 1, the $Y_1$ output line is selected since the $I_1$ input signal is directly applied thereto. At the same time output line $X_1$ is also selected not because of the $I_1$ input signal, but since with the absence of all other input signals as described previously, And circuit 32 is enabled thereby producing a 1 output. For the single punch 2, the $Y_{10}$ and the $X_2$ output lines are selected. By the absence of all input signals of significance higher the $I_2$, all of the inputs to And circuit 30 are 1's and its output will then be a 1, driving the $X_2$ output line. At the same time the inversion of the signal appearing on the $X_2$ output line is applied to the And circuit 62, blocking it and preventing a signal from appearing on the $Y_2$ output line. Since no other input signals occur, all of the other Y line And circuits 64 . . . 76 are disabled and all of the output lines $Y_1$ . . . $Y_9$ have no signal appearing on them. This results in the output of Or circuit 92 being a 0 which inverter 94 changes to a 1 signal on output line $Y_{10}$. In a similar manner for any single punch representation, the corresponding X output line is selected and the $Y_{10}$ output line is selected.

Now consider the double punch representation 7–5, as an example. The corresponding input signals $I_7$ and $I_5$ applied to the circuit of FIGURE 2 cause the $X_7$ and $X_5$ output lines to be selected. The $X_7$ line is selected since in the absence of input signals of greater significance than $I_7$, all of the signals to And circuit 20 are 1's; therefore And circuit 20 is enabled, placing a signal on the $X_7$ line. The X And circuit 24 associated with the $I_5$ input signal however, is disabled through the inversion of the signal appearing on the $X_7$ output line so that the output of that And circuit is 0. The inversion of the 0 signal on the $X_5$ output line, i.e., the output of inverter 54, applied to the And circuit 68 in FIGURE 2*b* along with the input signal $I_5$ places a signal on the $Y_5$ output line. At the same time, the inversion of the signal appearing on the $X_7$ output line, i.e., the output of inverter 50, is also applied to And circuit 72 as a 0, thereby preventing input signal $I_7$ from selecting the $Y_7$ output line. Similarly, for any other two punch representation used in the IBM code the input signal of higher significance will cause the corresponding X output line to be selected and at the same time prevent the selection of any other X output line, while the input signal of lower significance will cause the corresponding Y output line to be selected due to its combination with the inversion of the signal on the corresponding X output line.

The $Y_{10}$ output line can be said to be a "blank" line since it is selected in the absence of any of the input signals $I_1$ . . . $I_{10}$. The main purpose for not applying the input signal $I_1$ to And circuit 32 can now be explained. One of the valid representations in the IBM code involves no punches and represents the character Δ, used to indicate "printers space," as shown in the chart of FIGURE 1. By not applying the $I_1$ signal to And circuit 32, the $X_1$ output line can also be said to be a blank line since it is selected in the absence of any of the input signals $I_2$ . . . $I_{12}$. Therefore, for no punches at all, the two output lines $X_1$ and $Y_{10}$ are selected.

The only valid two punch representation not accounted for in the previously described circuit is the punch 11–12. Since there is no input $I_{11}$ or $I_{12}$ in the Y bank of the circuit, the $X_{12}$ and $Y_{10}$ output lines would be selected for this punch representation. However, this pair of X and Y output lines is also used for the ampersand character "&" represented by the punch 12. Therefore, to provide for this particular combination, input signals $I_{11}$ and $I_{12}$ are applied to And circuit 96 in FIGURE 2*b*. The output of And circuit 96 is coupled to the $Y_2$ output line through Or circuit 78 and at the same time is applied to Or circuit 98. The output of Or circuit 98 is applied via line 61 to the previously mentioned Or circuit 38 in FIGURE 2*a*. The output of Or circuit 98 is additionally presented to inverter 100 with the inversion being applied via line 33 to the FIGURE 2*a* And circuits 14 and 35 as well as the FIGURE 2*b* And circuits 64, 66 and 74 for purposes later described. The appearance of both input signals $I_{11}$ and $I_{12}$ at And circuit 96 produces a 1 signal which acts to select the output line $Y_2$. At the same time this signal passing through Or circuit 98 produces a 1 input via line 61 to And circuit 32 through Or circuit 38, and through the inversion in circuit 100 places a 0 input via line 33 on And circuits 14 and 35 disabling them. This action causes the output of And circuit 36 to be 0, but at the same time causes all the inverted inputs to And circuit 32 directly applied from the preceding greater significant And circuits 22, 24, 26, 28, 30, to be 1's. Due to the appearance at that time on line 61 of a 1 from Or circuit 98, And circuit 32 is satisfied, so that the $X_1$ output line is selected simultaneously with the $Y_2$ output line.

When the above described translator circuit is only concerned with single or two punch representations, the output of And circuit 96 may be applied as desired to any one of output lines $Y_2$ . . . $Y_9$, no limitation to the $Y_2$ output line being intended. Also, no limitation is intended as to the particular location illustrated and described for And circuit 36 of FIGURE 2*a*, since it may be moved up or down to And more or less of the inverter outputs, and in fact, may be eliminated as long as the outputs of And circuit 35 and the 10 inverters 42–60 are applied to each X output And circuit of lesser significance than the respective output, with the output of And circuit 35 being applied to And circuit 32 through Or circuit 38. In effect, then, And circuit 35 takes the place of And circuit 36. On the other extreme, And circuit 36 may be increased in size to handle 10 inputs, one from each inverter 42–58 plus one from And circuit 35, with its output still being coupled to Or circuit 38. Any intermediate location for And circuit 36 may also be employed. As previously indicated, it is used to reduce the maximum number of inputs required for any one of the And circuits of FIGURE 2*a*, and in its illustrated position effects the best compromise.

As indicated previously, there are six triple punch representations used in the IBM code. These involve the card digits or punches 3, 4, 8, 0, 11 and 12, in the combinations of 0, 11 or 12, with each of the pairs 3–8 and 4–8. To translate these combinations, a special circuit operative on the corresponding input signals $I_3$, $I_4$, $I_8$, $I_{10}$, $I_{11}$, and $I_{12}$, is provided in FIGURE 2*b* as follows. And circuit 102 has as inputs the signals $I_3$ and $I_8$, while And circuit 104 receives the input signals $I_4$ and $I_8$. The output of And circuit 104 is applied as an input to each of the further And circuits 106, 110 and 116. Still other And circuits 108, 112 and 114 receive the output of And circuit 102. The input signal $I_{10}$ is applied as a second input to And circuits 114 and 116, and the input signal $I_{11}$ is applied as a second input to And circuits 106 and 108. And circuits 110 and 112 each receive the input signal $I_{12}$ as a second input. The output of And circuit 106 then represents the concurrence of the three inputs $I_{11}$, $I_4$, $I_8$, and therefore the three punch marks 11–4–8. Similarly, the output of And circuit 108 represents the concurrence of input signals $I_{11}$, $I_3$, $I_8$, and therefore the punch marks 11–3–8, while the output of And circuit 110 represents the concurrence of the input signals $I_4$, $I_8$, $I_{12}$. An output from And circuit 112 indicates the concurrence of input signals $I_3$, $I_8$, $I_{12}$; from And circuit 114 the concurrence of input signals $I_3$, $I_8$, $I_{10}$; and from And circuit 116 the concurrence of input signals $I_4$, $I_8$, $I_{10}$.

The outputs of the And circuits 106, 108, 110, 112, 114 and 116 are applied respectively to Or circuits 80, 82, 84, 86, 88 and 90. Therefore one of the output lines $Y_3$ . . . $Y_8$ will be selected upon the occurrence of an output from one of And circuits 106, 108, 110, 112, 114 and 116, depending on which of the six combinations is present. The output of those And circuits are additionally applied as inputs to OR circuit 98. An output on line 61 therefore represents the occurrence of either the two punch code 11–12 or one of the above six, triple punch codes, while an output from inverter 100 indicates no one of those punch combinations is present.

The occurrence then of any one of these seven special code signal combinations produces a 1 output from the associated And circuit, placing a 1 signal on line 61 and a concurrent 0 signal on line 33. This signal on line 33 prevents an output from any of the FIGURE 2*a* And circuits 14, 15, 16, 17, 18, 20, 22, 24, 26, 28 and 30 in the X bank of the translator, while the 1 signal appearing on line 61 in conjunction with the 1's resulting from the inversion of the output of each of the And circuits 14–30, causes And circuit 32 to produce an output selecting the output line $X_1$. All of the X output lines are therefore locked out except for line $X_1$.

In FIGURE 2*b*, the application of the 0 signal on line 33 to And circuits 64, 66 and 74 in the Y bank of the translator likewise causes all of the Y output lines to be locked out except for the one which receives its Or input from one of the seven And circuits 96, 106, 108, 110, 112, 114 or 116 associated with the special code inputs. It may be noted that the inputs from line 33 to And circuits 64, 66 and 74 are necessary due to the particular manner in which the signals resulting from the special codes are applied to the Y bank Or circuits. For example, the signal resulting from the code combination 11–4–8 is applied through Or circuit 80 to output line $Y_3$. In this instance, without an input 0 from line 33 to And circuits 66 and 74 which receive respectively the input signals $I_4$ and $I_8$ and also the respectively associated inversions from the X bank, the output lines $Y_4$ and $Y_8$ would also be selected. Similarly, the 0 input to And circuit 64 from line 33 is necessary since output line $Y_4$ is selected by the signal resulting from the code 11–3–8 and without this input to And circuit 64, the $Y_3$ line would also be selected along with the $Y_8$ output line as described above. The circuit described is the preferred arrangement. However, the need for the input to And circuits 64 and 66 from line 33 can be eliminated by reversing the illustrated application of the signals from And circuits 106 and 108 to Or circuits 80 and 82 respectively. The need for the 0 input from line 33 to And circuit 74 can be eliminated by applying the signal resulting from the combination 0–4–8 to an Or circuit (not shown) in the $Y_9$ channel, that is, between the output of And circuit 76 and the $Y_9$ line output terminal, rather than applying the code signal for 0–4–8 to the Or circuit 90. In the circuit as described, using 12 X output lines and 10 Y output lines, it can be seen that, due to the circuitry in the Y bank of the translator, a maximum of up to eight special codes, that is the codes representing the two punch combination 11–12 and up to seven triple punch codes, could be employed by applying the eighth special code (seventh triple punch code) to an Or circuit which would be located in the $Y_9$ output line similarly to the location of the other Y output line Or circuits.

In the event that a card is laced, that is, contains more than a valid number of code perforations in a single column, more than one of the Y output lines will be selected. To account for this possibility, an analog detecting circuit 118 is provided to prevent a faulty readout. This detector emits an error signal if, and only if, more than one input to the detector has a signal impressed thereon. Each of the signals appearing on the Y output lines $Y_1 \ldots Y_{10}$ are therefore applied as inputs to the analog detector 118. This detector may take the form of an Exclusive Or-Not circuit.

From all the foregoing, it should be apparent that each of the inverters in FIGURES 2*a* and 2*b* effects a logical Not function and may actually be any conventional Not circuit. In the logical equations that follow, signals above referred to are represented by letters, some with subscripts and some of which are the same as the line designation carrying the respective signal. Any signal output of an inverter is represented by a line or bar over a letter as is conventional for indicating Not functions in logical equations.

With the signal appearing on line 61 being represented by the letter A, it is apparent the logical equation for that signal has the form:

$$A=I_{11}I_{12}+I_{10}I_8(I_3+I_4)+I_{11}I_8(I_3+I_4)+I_{12}I_8(I_3+I_4)$$

In other words, a signal A exists on line 61 when any one of the seven combinations represented in the above equation is present. The inverted signal appearing on line 33 is then represented as $\overline{A}$. Logical equations for the signals appearing on the output lines $X_{12} \ldots X_1$ may consequently be written as follows:

$$X_{12}=I_{12}(\overline{A})$$
$$X_{11}=I_{11}(\overline{X}_{12}\overline{A})=I_{11}(B)$$
$$X_{10}=I_{10}(\overline{X}_{11}B)=I_{10}(\overline{X}_{11}\overline{X}_{12})\overline{A}$$
$$X_9=I_9(\overline{X}_{10}\overline{X}_{11}\overline{X}_{12})\overline{A}$$
$$X_8=I_8(\overline{X}_9\overline{X}_{10}\overline{X}_{11}\overline{X}_{12})\overline{A}$$
$$X_7=I_7(\overline{X}_8 \ldots \overline{X}_{12})\overline{A}$$
$$X_6=I_6(\overline{X}_7 \ldots \overline{X}_{12})\overline{A}=I_6(C)$$
$$X_5=I_5(\overline{X}_6C)=I_5(\overline{X}_6 \ldots \overline{X}_{12})\overline{A}$$
$$X_4=I_4(\overline{X}_5 \ldots \overline{X}_{12})\overline{A}$$
$$X_3=I_3(\overline{X}_4 \ldots \overline{X}_{12})\overline{A}$$
$$X_2=I_2(\overline{X}_3 \ldots \overline{X}_{12})\overline{A}$$
$$X_1=(A+C)(\overline{X}_2 \ldots \overline{X}_6)=(\overline{X}_2 \ldots \overline{X}_6)A+(\overline{X}_2 \ldots \overline{X}_{12})\overline{A}$$

These equations generally take the form:

$$X_n=I_n\overline{A}$$
$$X_{n-1}=I_{n-1}\overline{X}_n\overline{A}, \text{ etc.}$$

and therefore each of the above equations may be rewritten in a general form using factoral notations as follows:

$$X_n=I_n\overline{A}\frac{\overline{X}_n!}{\overline{X}_n!}$$
$$X_{n-1}=I_{n-1}\overline{A}\frac{\overline{X}_n!}{\overline{X}_{n-1}!}$$
$$X_{n-2}=I_{n-2}\overline{A}\frac{\overline{X}_n!}{\overline{X}_{n-2}!}$$
$$\vdots$$
$$X_2=I_2\overline{A}\frac{\overline{X}_n!}{\overline{X}_2!}$$
$$X_1=\overline{A}\frac{\overline{X}_n!}{\overline{X}_1!}+A\frac{\overline{X}_{n-c}!}{\overline{X}_1!}$$

wherein:

$$0<c<(n-1),\ m\leqq n$$
$$\overline{X}_n!=\overline{X}_n(\overline{X}_{n-1}) \ldots \overline{X}_1$$

and A is a signal due to either the special 2 digit code represented by $(I_nI_{n-1})$ or a given one of at least $(m-4)$ input signal combinations representing special 3 digit codes and including at least either $I_m$, $I_{m+1}$, or $I_{m+2}$ and 2 out of at least a selected 3 of the remaining input signals $I_2 \ldots I_{n-1}$.

The notation *c* is employed in the above $X_1$ general equation to show that And circuit 36 in the X bank of the translator may be variously located, as discussed previously, to receive as inputs either the inversions of all of the signals appearing on output lines $X_3 \ldots X_{12}$, or in the position occupied by And circuit 35 where it would only apply to the signal $(\overline{AX}_{12})$ to Or circuit 38, or in any position intermediate those extremes. In the exemplary embodiment shown, $c$ is equal to 6, the term involving $c$ then becomes $$A\frac{\overline{X}_{12-6}!}{\overline{X}_1!}$$

which is equivalent to $A(\overline{X}_2 \ldots \overline{X}_6)$ which appears in the above specific X output line equations. When the translator is used without the special 3 digit codes the A term would equal $(I_{12}I_{11})$ and the above general X equations would remain the same with the A term being equal to $(I_nI_{n-1})$. If no special 3 digit codes are required, the special code circuitry could be dispensed with and the $I_n$ input could be applied directly to the $X_n$ output line and the above general X output would be dependent at least in accordance with the following more general equations:

$$X_n=I_n\frac{\overline{X}_n!}{\overline{X}_n!}$$

$$X_{n-1}=I_{n-1}\frac{\overline{X}_n!}{\overline{X}_{n-1}!}$$

$$\vdots$$

$$X_2=I_2\frac{\overline{X}_n!}{\overline{X}_2!}$$

$$X_1=\frac{\overline{X}_n!}{\overline{X}_1!}$$

The expressions for the output signals appearing on the Y output lines may be expressed by the following logical equations:

$$\begin{aligned}
Y_1 &= I_1\\
Y_2 &= I_2\overline{X}_2+I_{11}I_{12}\\
Y_3 &= I_3\overline{X}_3\overline{A}+I_{12}I_4I_8\\
Y_4 &= I_4\overline{X}_4\overline{A}+I_{12}I_3I_8\\
Y_5 &= I_5\overline{X}_5+I_{11}I_4I_8\\
Y_6 &= I_6\overline{X}_6+I_{11}I_3I_8\\
Y_7 &= I_7\overline{X}_7+I_{10}I_4I_8\\
Y_8 &= I_8\overline{X}_8\overline{A}+I_{10}I_3I_8\\
Y_9 &= I_9\overline{X}_9\\
Y_{10} &= \overline{Y}_1+\overline{Y}_2+\ldots+\overline{Y}_9
\end{aligned}$$

wherein A has the same form as in the specific X output equations above. Since the second term in the $Y_2 \ldots Y_8$ equations represents one of the at least seven special codes and each such term is one of those Ored to obtain the equation for the signal A appearing on line 61, the above Y equations may be rewritten in the following manner:

$$\begin{aligned}
Y_1 &= I_1\\
Y_2 &= I_2\overline{X}_2+A\\
Y_3 &= I_3\overline{X}_3\overline{A}+A\\
Y_4 &= I_4\overline{X}_4\overline{A}+A\\
Y_5 &= I_5\overline{X}_5+A\\
Y_6 &= I_6\overline{X}_6+A\\
Y_7 &= I_7\overline{X}_7+A\\
Y_8 &= I_8\overline{X}_8\overline{A}+A\\
Y_9 &= I_9\overline{X}_9\\
Y_{10} &= \overline{Y}_1+\ldots+\overline{Y}_9
\end{aligned}$$

wherein A has a different one of its seven values for each different Y. It can be seen that a general pattern appears in these Y equations and that they may be rewritten in a more general form so that the Y signals are dependent at least in accordance with the following:

$$\begin{aligned}
Y_1 &= I_1\\
Y_2 &= I_2\overline{X}_2\\
&\vdots\\
Y_{m-1} &= I_{m-1}\overline{X}_{m-1}\\
Y_m &= \overline{Y}_1+\overline{Y}_2+\ldots+\overline{Y}_{m-1}
\end{aligned}$$

where $$m \leq n$$

and where up to at least $(m-3)$ of the output signals $Y_2 \ldots Y_{m-1}$ alternatively additionally depend on at least one other term representing a special code and the logical equations for these particular Y output signals may each take the form:

$$Y_z=(I_z\overline{X}_z)+A$$

wherein:

$$1<z<m$$

and A has the form as in the above general X output equations. In this equation $z$ has the upper limit $(m-1)$ to allow for the condition mentioned above where $m$ is 10 and there may be an eighth special code employed in the translator. Since in the preferred embodiment, three of the $Y_m$ output lines (for example, $Y_3$, $Y_4$, $Y_8$) have an input $\overline{A}$ from line 33 to their respective And circuits and these three Y output lines are those which have an input signal to their respective And circuits corresponding to one of the digits used in the special code, the logical equations for these three Y output signals may be written in the form:

$$Y_w=I_w\overline{X}_w\overline{A}+A$$

where $w$ is one of the digits used in forming the special codes. The above $Y_m$, $Y_z$ and $Y_w$ equations combine to give the output, in general form, appearing on any one of the $m$ output lines Y.

When the translator is not used in conjunction with special inputs, the A and $\overline{A}$ signals disappear from the above Y equations, and Y signals then become dependent solely in accordance with the following logical equations:

$$\begin{aligned}
Y_1 &= I_1\\
Y_2 &= I_2\overline{X}_2\\
&\vdots\\
Y_{m-1} &= I_{m-1}\overline{X}_{m-1}\\
Y_m &= \overline{Y}_1+\overline{Y}_2 \ldots \overline{Y}_{m-1}
\end{aligned}$$

wherein:

$$m \leq n$$

It is noted that, while $m$ is obviously not greater than $n$, since there are only $n$ inputs in the embodiment shown for $(m-3)$ special codes, $m$ must be less than or equal to $(n-2)$. If only the special 2 digit code is used then $m$ must be less than or equal to $(n-1)$. However, $m$ can be less than or equal to $m$, for up to $(m-2)$ special codes by applying the blocking signal $\overline{A}$ to each Y And circuit whose respective input signal is also used in producing the special code signal A.

In the above described embodiment of the present invention, therefore, there is presented a code translator in which input signals representing one character at a time in the standard IBM 80 column code, are changed into signals which may be employed to select a predetermined pair of memory matrix drive lines to enable the reading of the X S-2 code, stored at the intersection of that pair of drive lines, which represents the given character. For example, the combination of input signal $I_{12}$, $I_5$ representing the IBM code for the character E, causes the selection of the output lines $X_{12}$ and $Y_5$. At the intersection of the associated memory matrix drive lines is stored the X S-3 code 1011000 also representing the character E. In like manner, there is stored at each of the valid code positions shown in the matrix plane of FIGURE 2*b*, the valid X S-3 code representing the corresponding IBM coded characters. As described previously, an invalid code is stored at each of the invalid memory positions. While the "UNIVAC" X S-3 code is employed as the ultimate output in this embodiment, no limitation thereto is intended. The translator of this invention acts to select a different predetermined pair of output lines in response to each different signal combination representing one character in a predetermined code. Obviously then, any preselected code having valid representations of the characters in the said predetermined code could be stored in the associated memory matrix unit with the corresponding representations loaded into the unit at the proper position.

A translator has been provided therefore for changing a predetermined code of up to at least three digits out of 12 into signals which may be employed to select a different pair of memory matrix drive lines for each different character representation of the predetermined code.

It is thus apparent that this invention successfully achieves the various objects and advantages herein set forth.

Modifications of this invention not described herein will become aparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Translating apparatus for changing a predetermined code of up to at least 2 out of $n$ digits each representable as input signals $I_1 \ldots I_n$ to a signal in one of a plurality of X output lines $1 \ldots n$ and a simultaneous signal on one of a plurality of Y output lines $1 \ldots m$, where $m$ is not greater than $n$, comprising $n$ input terminals for respectively receiving said input signals as they appear up to at least 2 at a time, said X and Y output lines $1 \ldots n$ and $1 \ldots m$ respectively, a plurality of X And circuits $1 \ldots (n-1)$ each having an output coupled to a respective one of the X output lines, means coupling the $I_2 \ldots I_{n-1}$ input signals one each to a respective one of the X And circuits, means effectively coupling the $I_n$ input signal to the $X_n$ output line, a plurality of circuit means each receiving the signal appearing on a respective one of the X output lines $n \ldots 2$ and producing an inverted output, means coupling each of the said inverted outputs as an effective input to each succeeding X And circuits $(n-1) \ldots 1$, a plurality of Y And circuits $2 \ldots (m-1)$ each having an output effectively coupled to a respective one of the Y output lines, means effectively coupling the $I_1$ input signal to the $Y_1$ output line, means also coupling the $I_2 \ldots I_{m-1}$ input signals to a respective Y And circuit, means coupling the said inverted output appearing on each of the X output lines $2 \ldots (m-1)$ as an input to each of the corresponding Y And circuits, means including an Or circuit and having an inverted output coupled to the $Y_m$ output line, and means coupling the outputs appearing on all preceding Y output lines $1 \ldots (m-1)$ as inputs to the last mentioned means, whereby one of each of the X and Y output lines is selected for each predetermined code of up to at least 2 out of said $n$ digits including none.

2. Translating apparatus for changing a predetermined code of up to at least 3 out of $n$ digits respectively presentable as input signals $I_1 \ldots I_n$ to a signal in one of a plurality of X output lines $1 \ldots n$ and a plurality of Y output lines $1 \ldots m$, where $m$ is not greater than $n$, comprising $n$ terminals each receiving a respective one of said input signals, said X and Y output lines $1 \ldots n$ and $1 \ldots m$ respectively, a first plurality of circuit means $n \ldots 1$ each having both a normal and an inverted output (said circuit means 1 not having an inverted output), means coupling each of the said input signals $I_n \ldots I_2$ to a respective one of said first circuit means, means effectively coupling each of the said inverted outputs $n \ldots 2$ as an input to each succeeding one of the first circuit means $(n-1) \ldots 1$, means coupling each of the said first circuit means normal outputs to a respective one of the said X output lines $n \ldots 1$, a second plurality of circuit means $(m-1) \ldots 2$ for receiving one each a respective one of the said input signals $I_{m-1} \ldots I_2$ and producing a normal output when said second circuit means is satisfied, means additionally coupling the inverted output from each of the said first circuit means $(m-1) \ldots 2$ as an input to the respective one of the said second circuit means, means effectively coupling the $I_1$ input signal to the $Y_1$ output line, means effectively coupling each of the said second circuit means normal ouputs to a respective one of the said Y output lines $2 \ldots (m-1)$, further circuit means for producing an inverted output when any of its inputs is present and having said inverted output coupled to the $Y_m$ output line, means additionally coupling each of the said second circuit means normal outputs as an input to said further circuit means, and further including special code circuitry coupled to both said first and second circuit means and having an output signal $\overline{A}$ for causing a signal only on the $X_1$ output line and having an output signal A for causing on at least one of the Y output lines a signal further dependent on the output A which output represents the simultaneous occurrence of at least one predetermined group of 3 of said input signals.

3. Translating apparatus for converting information-carrying codes represented by electrical signals, having a predetermined first set of signal combinations, to information-carrying codes represented by output signals from selected memory elements which have a prestored second set of codes comprising: a plurality of input lines for carrying coded data to be converted, said data being represented by a combination of electrical signals arranged as one of a predetermined set of codes; code translation means responsively coupled to said plurality of input lines for providing discrete memory-register selection signals for each of said input codes; a memory matrix consisting of a plurality of memory elements arranged in addressable registers, for storing a second predetermined set of codes therein, with register selection means responsively connected to said code translation means, and having sensing means associated with said addressable registers for providing a combination of output signals, which represent the converted input code, from a selected one of said addressable registers.

4. Translating apparatus for converting information-carrying codes represented by electrical signals in a first set of predetermined sequences to information-carrying codes represented by output signals in a second set of predetermined sequences from selected memory elements comprising: a plurality of input lines for carrying coded data represented by a combination of electrical signals, which is to be converted; a first set of code translation circuits responsively connected to said plurality of input lines to provide X-line memory address selection; a second set of code translation circuits responsively connected to said plurality of input lines to provide Y-line memory address selection; a memory matrix for storing a predetermined second set of codes, said array made up of a plurality of memory elements having a first set of register-selection lines responsively connected to said first set of code translation circuits, a second set of register selection lines responsively connected to said second set of code translation circuits, and having lines associated with said plurality of memory elements to sense the translated output signals caused to be generated in response to said X-line and Y-line selection circuits.

5. Apparatus to translate coded data represented by electrical signals from one set of predetermined codes to another comprising: input means for carrying coded data to be converted; first and second translation means coupled to said input means to provide access to a selected memory register in response to signals received from said first and second translation means; a first error detection means coupled to said first translation means to provide an error-indicating signal in response to detected errors in first translation; a memory matrix consisting of a plurality of memory elements arranged in accessible registers, each of said registers which is accessible by a predetermined valid input code arranged for storing the signal configuration of the predetermined desired converted codes and each register which is nonaccessible by translation of predetermined valid input code being arranged for storing an error-code, said memory having first and second register access selection means responsively coupled to said first and second translation means, and having sensing means associated with each of said memory registers to provide output signals indicative of the coded signals stored in the accessed memory register; and a second error-detection means responsively coupled to said sensing means to provide an error-indicating signal in response to the selection of a register arranged for storing an error-code, and providing no error-indicating signal in response to the selection of a register arranged for storing a valid sequence of signals representing a converted code.

6. Translating apparatus for changing a predetermined code of up to at least two out of *n* digits respectively representable as input signals to a signal on one of a plurality of X-output lines and a simultaneous signal on one of a plurality of Y-output lines comprising:

*n* input terminals for receiving input signals representative of data in a first predetermined coded form for causing activation of not more than any two of said input terminals;

a plurality of X-output lines and a plurality of Y-output lines where the number of said Y-output lines is not greater than said number of X-output lines; and, X-line circuit means coupled to said *n* input terminals for providing an output on one of said plurality of X-output lines in response to said two-of-*n* coded input signals; and Y-line circuit means coupled to said *n* input terminals and said X-output lines for providing an output on one of said plurality of Y-output lines in response to said two-of-*n* coded input signals.

7. Translating apparatus for changing a predetermined coded input message of *n* digits respectively represented by input signals to a signal on one of a plurality of X-lines and a simultaneous signal on one of a plurality of Y-output lines comprising:

*n* input terminals for receiving input signals representative of data coded in a first predetermined form for causing activation of ones of said input terminals;

a plurality of X-output lines and a plurality of Y-output lines, the arrangement such that the number of said Y-output lines is not greater than said number of X-output lines;

X-line translation means coupled to said *n* input terminals for providing an output signal on one of said plurality of X-output lines, the X-line activated being indicative of the code signals applied at said input terminals;

Y-line translation means coupled to said *n* input terminals for providing an output signal on one of said plurality of Y-output lines, the Y-line activated being indicative of the code signals applied at said input terminals; and, error-detecting means coupled to said Y-line translation means for providing a first valued signal when one of said Y-output lines is activated and for providing a second valued signal when more than one of said Y-output lines are activated.

8. Code conversion apparatus for translating data representing signals from a predetermined set of codes to another comprising:

input means for carrying coded data signals;

memory means including a plurality of memory elements arranged in registers accessible by translation of input signals for storing predetermined second sets of codes;

first and second translation means coupled to said input means, each of said translation means for providing a single manifestation indicative of the input code for accessing selected ones of said memory registers;

sensing means including a plurality of lines associated with said memory registers for providing output signals which represent the converted input code from said accessed memory register; and, error-detecting means coupled to said first translation means for providing an error indicating signal when more than said single manifestation indicative of the input code is determined to be present.

9. Code conversion apparatus as in claim 8 wherein said error-detecting means comprises a detector coupled to each output circuit of said first translation means for providing a first valued signal when one of said output circuits is active and a second valued signal when more than one of said output circuits is active.

10. Code conversion apparatus for translating data-representing signals arranged in a predetermined coded form to data-representing signals arranged in a second predetermined coded form, comprising:

input means for receiving input signals representative of data in a first predetermined coded form;

memory means including a plurality of bistable magnetizable memory elements arranged in accessible registers of a predetermined number of stages for storing predetermined desired codes including a parity digit for each register;

translation means coupled to said input means for providing memory-register selection signals for selectively accessing predetermined ones of said registers;

means for setting each of said registers which is accessible by a valid input code to a predetermined desired converted code including a parity digit, the combinations of said desired converted codes and said parity digits having a first overall parity value, and for setting each of said registers which is inaccessible by a valid input code to a predetermined error code including a parity digit, the combinations of said error codes and said parity digits having a second overall parity value;

means for sensing output signals indicative of the stored signal configuration from accessed ones of said registers; and, error-detecting means responsively coupled to said sensing means for providing an error-indicating signal when said second overall parity value is detected, and for providing no error-indicating signal when said first overall parity value is detected.

References Cited by the Examiner

UNITED STATES PATENTS

| | | | |
|---|---|---|---|
| 2,973,506 | 2/61 | Newby | 340—347 |
| 3,011,165 | 11/61 | Angel | 340—347 |
| 3,024,454 | 3/62 | Chaimowicz | 340—347 |
| 3,029,413 | 4/62 | O'Connor | 340—172.5 |

MALCOLM A. MORRISON, *Primary Examiner*.